United States Patent
Maehata et al.

(10) Patent No.: US 6,467,628 B1
(45) Date of Patent: Oct. 22, 2002

(54) PLASTIC CHIP SEPARATOR

(75) Inventors: Hidehiko Maehata, Osaka (JP); Tetsuya Inoue, Osaka (JP); Hiroyuki Daiku, Osaka (JP); Masanori Tsukahara, Osaka (JP); Daisuke Tamakoshi, Osaka (JP)

(73) Assignee: Hitachi Zosen Corporation (JP)

( * ) Notice: Subject to any disclaimer, the term of this patent is extended or adjusted under 35 U.S.C. 154(b) by 0 days.

(21) Appl. No.: 09/744,050

(22) PCT Filed: Mar. 21, 2000

(86) PCT No.: PCT/JP00/01727

§ 371 (c)(1), (2), (4) Date: Jan. 18, 2001

(87) PCT Pub. No.: WO00/74855

PCT Pub. Date: Dec. 14, 2000

(30) Foreign Application Priority Data

Jun. 8, 1999 (JP) .......................................... 11-160295

(51) Int. Cl.$^7$ ................................................ B03C 7/00
(52) U.S. Cl. .................. 209/12.2; 209/127.3; 209/129; 209/130
(58) Field of Search .............................. 209/12.1, 12.2, 209/127.1, 127.3, 127.4, 128, 129, 130

(56) References Cited

U.S. PATENT DOCUMENTS 2,559,076 A * 7/1951 Johnson ................ 209/12.2 X
3,493,109 A * 2/1970 Carta et al. ............ 209/12.2 X
5,746,320 A * 5/1998 Fujita et al. ......... 209/127.4 X
6,011,229 A * 1/2000 Geisler et al. ........... 209/127.4

FOREIGN PATENT DOCUMENTS

| DE | 4217480 | * 11/1993 | ................ 209/12.2 |
| GB | 588003 | * 1/1978 | ................ 209/12.2 |
| JP | 57032748 A | 2/1982 | |
| JP | 09299827 A | 11/1997 | |
| JP | 10323580 A | 12/1998 | |

* cited by examiner

Primary Examiner—Tuan N. Nguyen
(74) Attorney, Agent, or Firm—Mark Kusner; Michael A. Jaffe (57) ABSTRACT

A device for electrostatically separating different kinds of crushed plastic pieces and correctly sorting them according to kind. The device has a classifying section (40) for classifying plastic pieces according to size, a frictional charging device (17), a pair of drum type electrostatic separating devices (41), and collecting sections (26) disposed below the electrostatic separating devices. Partition walls (52–55) for partitioning the collecting sections are constructed to be horizontally movable according to the fall positions associated with the polarity and amount of electric charge of each plastic piece (16). Therefore, separation can be correctly effected without changing the voltage from a high voltage power source device (24).

3 Claims, 6 Drawing Sheets

PRIOR ART

PLASTIC CHIP SEPARATOR

TECHNICAL FIELD

The present invention relates to a plastic sorting device by which plastic pieces resulting from recycling are sorted according to kind.

BACKGROUND ART

Figure 6:
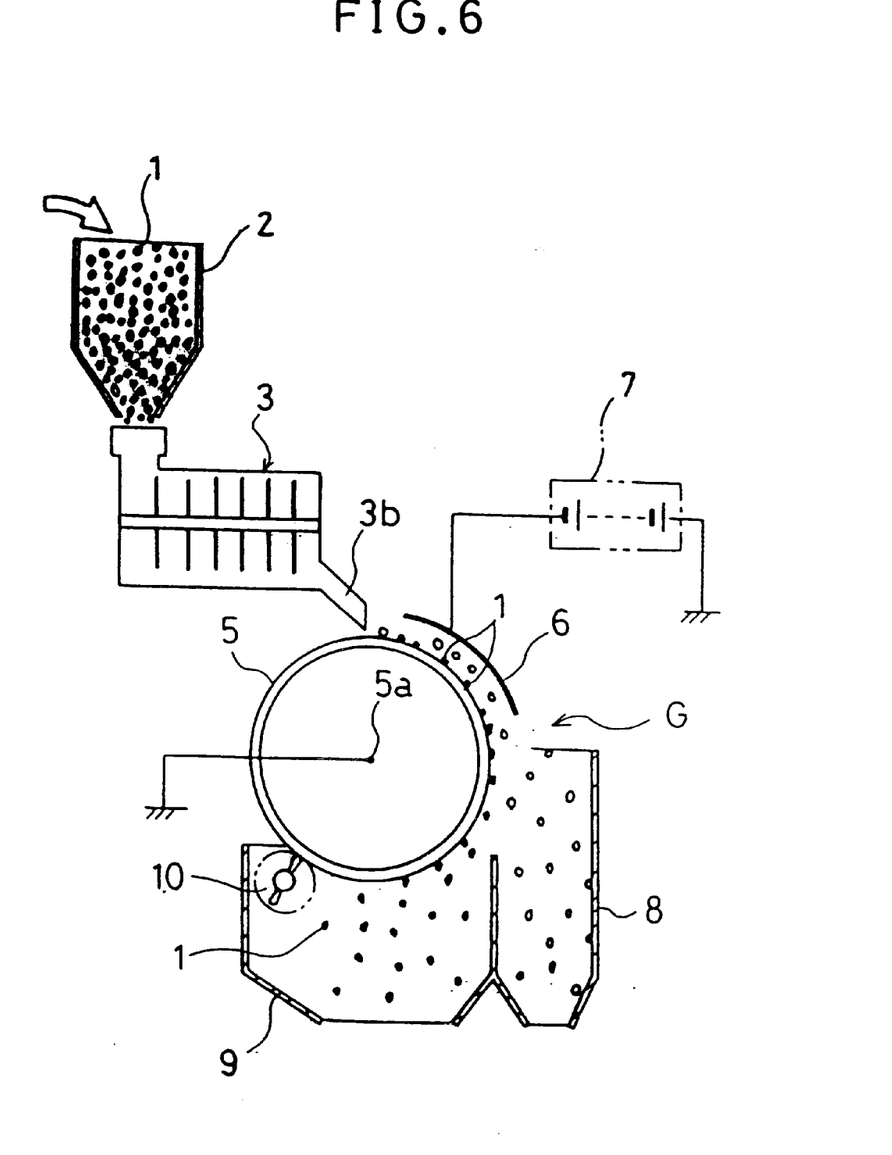
FIG. 6 is a complete structural view of a conventional plastic sorting device.

In recent years, recycling of waste refuse has advanced rapidly. In this connection, as a technique for sorting crushed plastic pieces, there is a plastic sorting device as shown in FIG. 6. This plastic sorting device comprises a frictional charging device 3 that is disposed below a hopper 2 adapted to have a plurality of kinds of plastic pieces 1 put therein and that is used to charge the plastic pieces 1 to give the latter a polarity and an amount of electric charge according to kind, and an electrostatic separator G disposed below said frictional charging device 3 and used to separate the charged plastic pieces 1 according to polarity and amount of electric charge.

And the electrostatic separator G comprises a metal drum electrode 5 disposed below the chute 3b of the frictional charging device 3, a high voltage electrode 6 disposed obliquely above the metal drum electrode 5, and a brush 10 for scraping the plastic pieces 1 sticking to the peripheral surface of the metal drum electrode 5. In addition, said metal drum electrode 5 is constructed for rotation around a horizontal axis 5a in a predetermined direction and is grounded. Connected to the high voltage electrode 6 is, for example, the cathode of a high voltage power source device 7, the anode thereof being grounded? This connection provides a sorting electrostatic field formed between the high voltage electrode 6 and the metal drum electrode 5.

First and second separating vessels 8 and 9 for collecting according to kind the plastic pieces 1 that have passed through. this sorting electrostatic field are fixedly disposed below the metal drum electrode 5.

In said plastic sorting device, when the plastic pieces 1 are put in the hopper 2, they are fed from the hopper 2 into the frictional charging device 3, where they are stirred and each frictionally charged to have a predetermined polarity and an amount of electric charge according to kind-based electrification rank. Thereafter, they fall down to the electrostatic separator G, pass through the sorting electrostatic field, and are collected in the separate vessels 8 and 9 as they are classified according to polarity and amount of electric charge.

In this connection, in said plastic sorting device, the plastic pieces 1 are each frictionally charged in the frictional charging device 3 to have a polarity and an amount of electric charge, with an electrification rank corresponding to the plastic pieces 1 established, and are separated by the electrostatic separator G and collected in the vessels 8 and 9 according to kind.

However, the crushed plastic pieces 1 put in the hopper 2 differ in size (weight), so that when the plastic pieces 1 charged in the frictional charging device 3 pass through the sorting electrostatic field, their collected positions may vary according to the size of the plastic pieces 1 even if they assume the same position in the electrification rank, making it impossible to attain correct electrostatic separation according to kind.

Accordingly, the present invention has for its object the provision of a plastic sorting device capable of solving said problem.

DISCLOSURE OF THE INVENTION

The means for solving the problem according to the invention is to provide an arrangement comprising a frictional charging device for stirring and frictionally charging different kinds of crushed plastic pieces, a pair of electrostatic separating sections disposed below said frictional charging device for electrostatic separation of each plastic piece according to its polarity and amount of electric charge, each of said electrostatic separating sections having a drum electrode rotatable around a predetermined horizontal shaft, and an opposed electrode disposed adjacent said drum electrode through a separating space serving as a sorting electrostatic field, characterized by further comprising: a collecting section that is common to the electrostatic separating sections and that is disposed below the separating space between said drum electrodes for separately collecting plastic pieces that have passed through said separating space and thereby been separated, said collecting section having a plurality of collecting chambers for collecting plastic pieces according to kind; and a classifying section that, in frictionally charging said different kinds of crushed plastic pieces by the frictional charging device, classifies the plastic pieces according to size and load them into the frictional charging device.

In the above arrangement, plastic pieces are classified according to size in the classifying section and then loaded into the frictional charging device, where they are stirred, and each plastic piece is electrostatically separated according to its polarity and amount of electric charge in the pair of electrostatic separating sections disposed below said frictional charging device. In these electrostatic separating sections, the drum electrode rotatable around a predetermined horizontal shaft is rotated, the opposed electrode is disposed adjacent said drum electrode through a separating space serving as a sorting electrostatic field and has a voltage imposed thereon, and the plastic pieces are passed through the separating space and are separately collected in the common collecting section.

Further, the collecting section has partition walls for partitioning said plurality of collecting chambers, said partition walls being constructed to be adjustable for horizontal movement toward and away from the drum electrode, and a moving means is provided for horizontally moving the partition walls to the fall positions corresponding to the size of each plastic piece.

According to this arrangement, on the basis of the size of each plastic piece, the moving means is used for adjustment so as to horizontally move the partition walls toward and away from the drum electrode, so that electrostatic separation of the plastic pieces is correctly effected.

Further, the collecting section has partition walls for partitioning said plurality of collecting chambers, said partition walls being constructed to be swingable around support shafts parallel to the horizontal shaft of the drum electrode, and a swing means is provided for swinging the partition walls around the support shafts to the fall positions corresponding to the size of each plastic piece.

According to this arrangement, on the basis of the size of each plastic piece, the swing means is used to swing the partition walls around the support shafts parallel to the horizontal shaft of the drum electrode, so that electrostatic separation of the plastic pieces is correctly effected.

EMBODIMENTS OF THE INVENTION

Embodiments of the invention will now be described with reference to the drawings. First, a plastic sorting device 15 according to a first embodiment of the invention will be described with reference to FIGS. 1–4.

Figure 1:
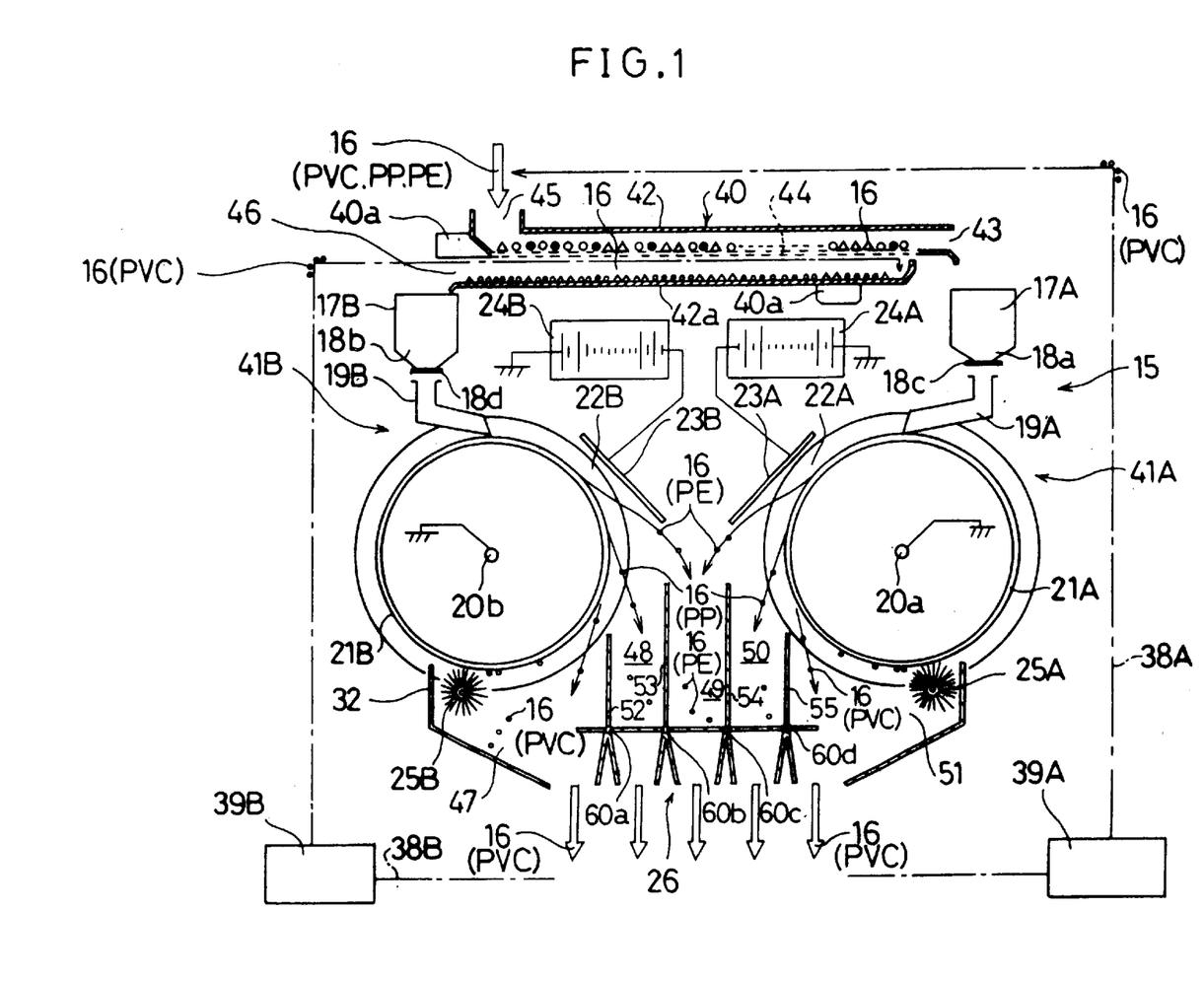
FIG. 1 is a complete structural view of a plastic sorting device showing a first embodiment of the invention.

The plastic sorting device 15 according to the first embodiment of the invention is used to separately collect different kinds of resin type plastic pieces (crushed waste to be sorted) 16; for example, as the plastic pieces 16, PE (polyethylene) and PP (polypropylene) are separately collected. In addition, it is understood that the PE and PP to be used are crushed in advance on a 10-mm basis.

And the plastic sorting device 15 in the first embodiment of the invention, as shown in FIG. 1, comprises a screen member (classifying section) 40 with a vibrator 40a for classifying the plastic pieces 16 according to size, a pair of. frictional charging devices 17A and 17B disposed below and on opposite sides of said screen member 40, a pair of electrostatic separators 41A and 41B disposed below said frictional charging devices 17A and 17B, and a common collecting section 26 disposed below the electrostatic separators 41A and 41B for collecting the plastic pieces 16 according to kind.

The screen member 40, as shown in FIG. 1, comprises a flat classifying vessel 42, and a screen 44 disposed within said classifying vessel 42 such that it is downwardly inclined toward a first unloading port 43 to be later described, the meshes of said screen 44 being 10 mm. Formed in the upper left of said classifying vessel 42 is a loading port 45 for loading a mixture of different kinds and sizes of plastic pieces 16. The classifying vessel 42 is formed on its right-hand side with said first unloading port 43 for unloading the plastic pieces 16 that have been classified by the screen member 40 according to diameter, and on the lower left-hand side with a second unloading port 46 disposed on the lower left-hand side of the classifying vessel 42, said first unloading port 43 being used for unloading the plastic pieces 16 having sizes larger than 10 mm, said second unloading port 46 being used for unloading the plastic pieces 16 having sizes of 10 mm and less. The bottom plate 42a of the classifying vessel 42 is inclined opposite to the screen 44, that is, inclined toward the second unloading port 46.

The frictional charging devices 17A and 17B are formed with openable/closable unloading ports 18a and 18b, the latter being provided with horizontally movable shutters 18c and 18d for opening and closing said unloading ports.

Said electrostatic separators 41A and 41B are provided with unloading chutes 19A and 19B connected to the frictional charging devices 17A and 17B for frictionally charging PE and PP in the state of being loaded with PVC (polyvinyl chloride) to be later described mixed therein, a pair of metal drum electrodes 21A and 21B disposed close to the undersides of said unloading chutes 19A and 19B for rotation around predetermined horizontal shafts 20a and 20b and grounded, high voltage electrodes (opposed electrodes) 23A and 23B disposed obliquely upwardly of and opposed to the said metal drum electrodes 21A and 21B with separating spaces 22A and 22B disposed therebetween to serve as classifying electrostatic fields, a pair of high voltage power source devices 24A and 24B connected at their cathodes to said high voltage electrodes 23A and 23B and grounded at their positive electrodes, serving to impose high voltage on the separating spaces 22A and 22B, and brushes 25A and 25B disposed below the peripheral surfaces of the metal drum electrodes 21A and 21B for scraping off the plastic pieces 16 sticking to the metal drum electrodes 21A and 21B.

Further, the collecting section 26 disposed below said separating spaces 22A and 22B comprises a plurality (in this case, 5) of collecting chambers 47, 48, 49, 50, and 51, four partition walls 52, 53, 54, and 55 for partitioning said collecting chambers 47, 48, 49, 50, and 51, and an outer peripheral wall 32, said partition walls 52, 53, 54, and 55 being constructed to be adjustable for horizontal movement toward and away from said metal drum electrodes 21A and 21B.

Figure 2:
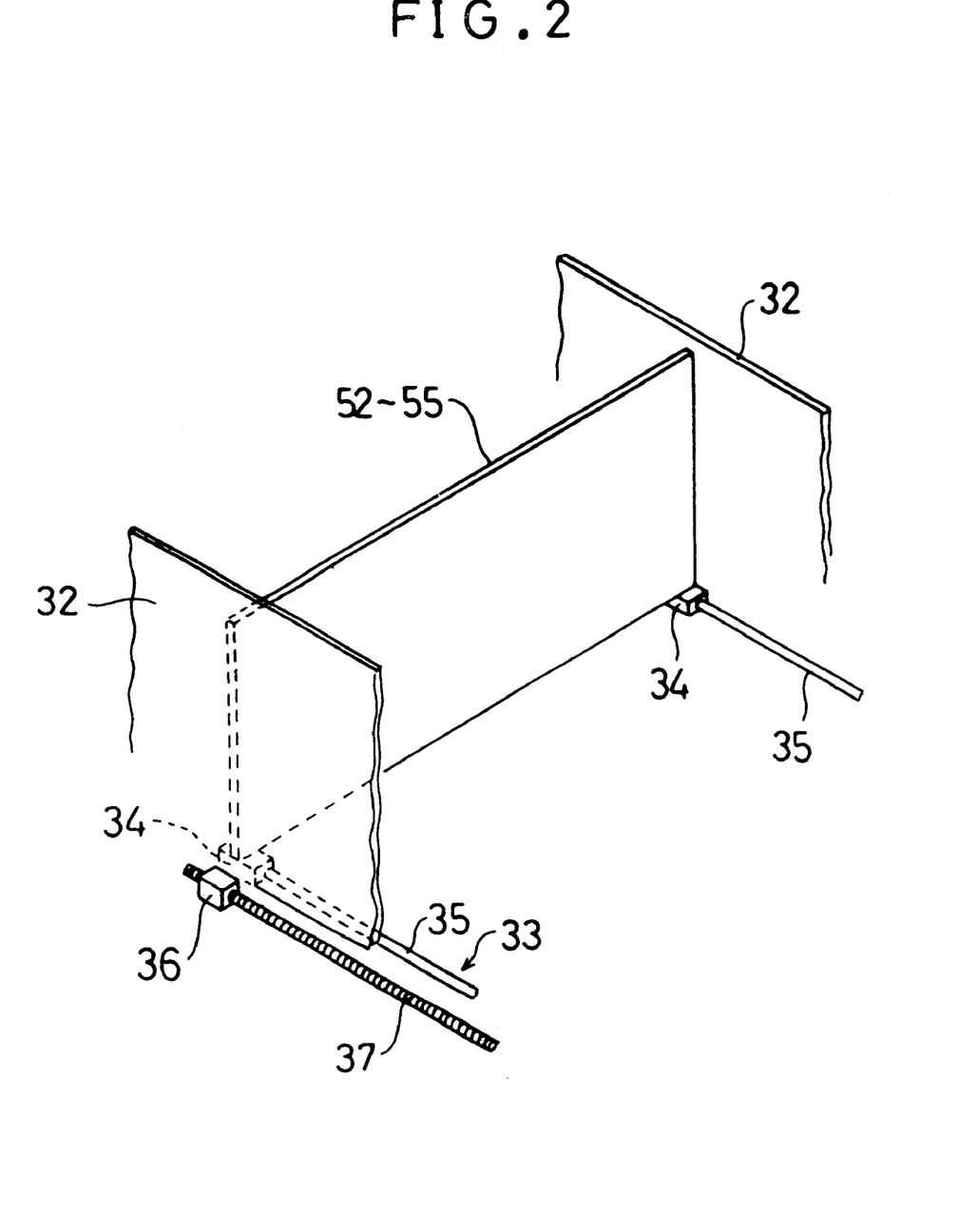
FIG. 2 is a perspective view showing the arrangement of a collecting section.
Figure 3:
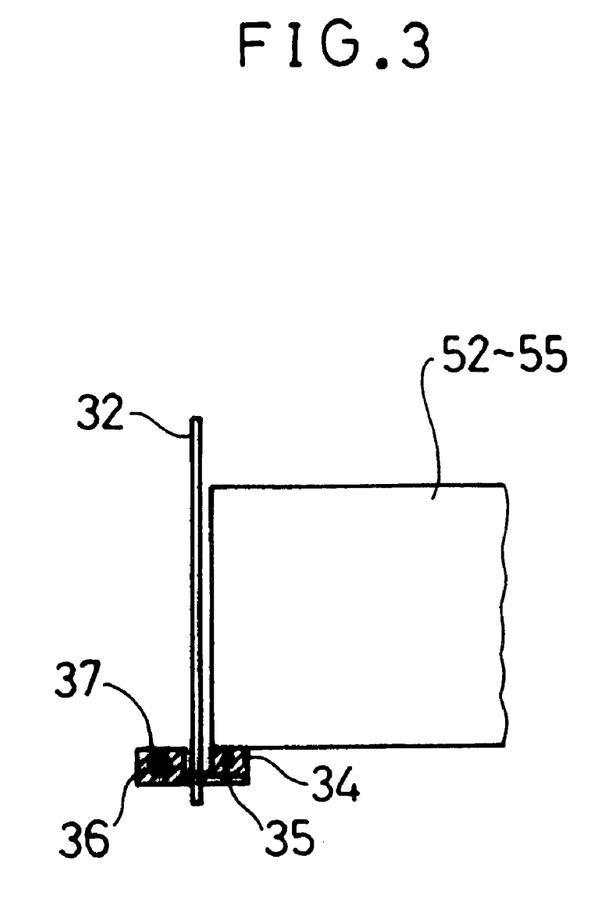
FIG. 3 is a sectional view showing the arrangement of the collecting section.

As shown in FIGS. 2 and 3, a moving means 33 is installed for horizontally moving said partition walls 52, 53, 54, and 55 to positions to which the plastic pieces 16 separately drop according to polarity and amount of electric charge. The moving means 33 comprises a pair of guides 35 in which partition walls 52, 53, 54, and 55 are horizontally disposed for movement toward and away from said metal drum electrodes 21A 21B and which are individually attached to each partition wall. 52, 53, 54, and 55 through a fitting member 34, a ball screw 37 threadedly fitted in a threaded member 36 attached to the fitting member 34 of the guide 35, and an unillustrated motor for rotating the ball screw 37.

Further, said collecting section 26 has a pair of reusing devices 39A and 39B attached thereto for returning PVC of said plastic pieces 16 to the frictional charging devices 17A and 17B through return tubes 38A and 38B.

Further, though not shown, an image processor for observing the electrostatic separation of the plastic pieces 16 is installed in a predetermined location.

Now, when the plastic pieces 16 to be sorted. are frictionally charged by the frictional charging devices 17A and 17B, as a rule they are charged either plus or minus according to the electrification rank. However, if the plastic pieces 16 to be sorted have closely adjacent positions in the electrification rank and include no material that has an intermediate position, such material is added as a friction material to the plastic pieces 16. And in this embodiment, said PVC is added as a friction material for sorting PE and PP. And when PE, PP, and PVC are stirred in the frictional charging devices 17A and 17B and thereby charged, the resulting electrification rank is (+) PE<PP<PVC (−).

Therefore, when PE and PP are to be sorted, mixed plastics of PE, PP, and PVC are loaded as plastic pieces 16 into the frictional charging devices 17A and 17B and stirred therein, each plastic piece 16 is charged according to kind to have a predetermined polarity and an amount of electric charge. That is, there is obtained the electrification rank (+) PE<PP<PVC (−).

In the above arrangement, the method of sorting the plastic pieces 16 will now be described. First, the plastic pieces 16 are crushed into a substantially spherical form on a 10-mm basis. And the plastic pieces 16 (a mixture of PE, PP, and PVC) are loaded through the loading port 45 of the screen member 49. Thereupon, the disposition of the screen 44, which is downwardly inclined toward the first unloading port 43, coupled with the vibrating action produced by the vibrator 40a, moves the plastic pieces 16 toward the first unloading port 43. At this time, the plastic pieces 16 that are more than 10 mm long remain on the screen 44 and are unloaded trough the first unloading port 43 and loaded into the frictional charging device 17A. The plastic pieces 16 that are 10 mm and less fall onto the bottom plate 42a of the classifying vessel 42. The bottom plate 42a, which is inclined to the side opposite to the screen 44, causes them to be unloaded through the second unloading port 46 of the classifying vessel 42 and loaded into the frictional charging device 17B. Thus, the plastic pieces 16 are frictionally charged individually on a 10-mm basis by the frictional charging devices 17A and 17B.

And the plastic pieces 16 frictionally charged by the frictional charging devices 17A and 17B fall through the unloading ports 18c and 18d, with the shutters 18a and 18b opened, and through the unloading chutes 19A and 19B onto the metal drum electrodes 21A and 21B. Thereupon, with the rotation of the metal drum electrodes 21A and 21B, the three kinds of plastic pieces 16 pass through the separating spaces 22A and 22B to fall into the collecting section 26.

In this connection, when the plastic pieces 16 pass through their respective separating spaces 22A and 22B, the PE, which is charged (+), is attracted to the high voltage electrodes 23A and 23B having cathodes connected thereto and is collected in the collecting chamber 49, while the PVC, which is charged (−), is attracted to the metal drum electrodes 21A and 21B and collected in the collecting chambers 47 and 51 or the PVC sticking to the metal drum electrodes 21A and 21B is scraped off into the collecting chambers 47 and 51. Further, the PP, having an intermediate position in the electrification rank, is collected in the collecting chambers 48 and 50.

At this time, the plastic pieces 16 are separated according to diameter (weight); therefore, when the same voltage. is imposed on the high voltage electrodes 23A and 23B, for example, there is a possibility that the fall positions of the plastic pieces 16 are deviated. In this case, there are possibilities of incorrect collection, such as the PE of small diameter, which should be collected in the collecting chamber 49, reaching the collecting chamber 50. Accordingly, the electrostatic separation of the plastic pieces 16 is observed by the image processor.

If the observation by this image processor denies that PE, PVC, and PP are correctly separated and collected in. the collecting chambers 49, 47 and 51, and 48 and 50, respectively, then, without changing the load voltages on the high voltage power source devices 24A and 24B, the motor is driven to rotate the ball screw 37 according to the polarity and amount of electric charge imparted to the plastic pieces 16, so as to move at least one of the partition walls 52, 53, 54 and 55 toward and away from the metal drum electrode 21A or 21B, thereby adjusting the positions of the collecting chambers 47–51 to ensure that the PVC, PP, and PE are respectively collected in the collecting chambers 47–51 according to kind.

Figure 4:
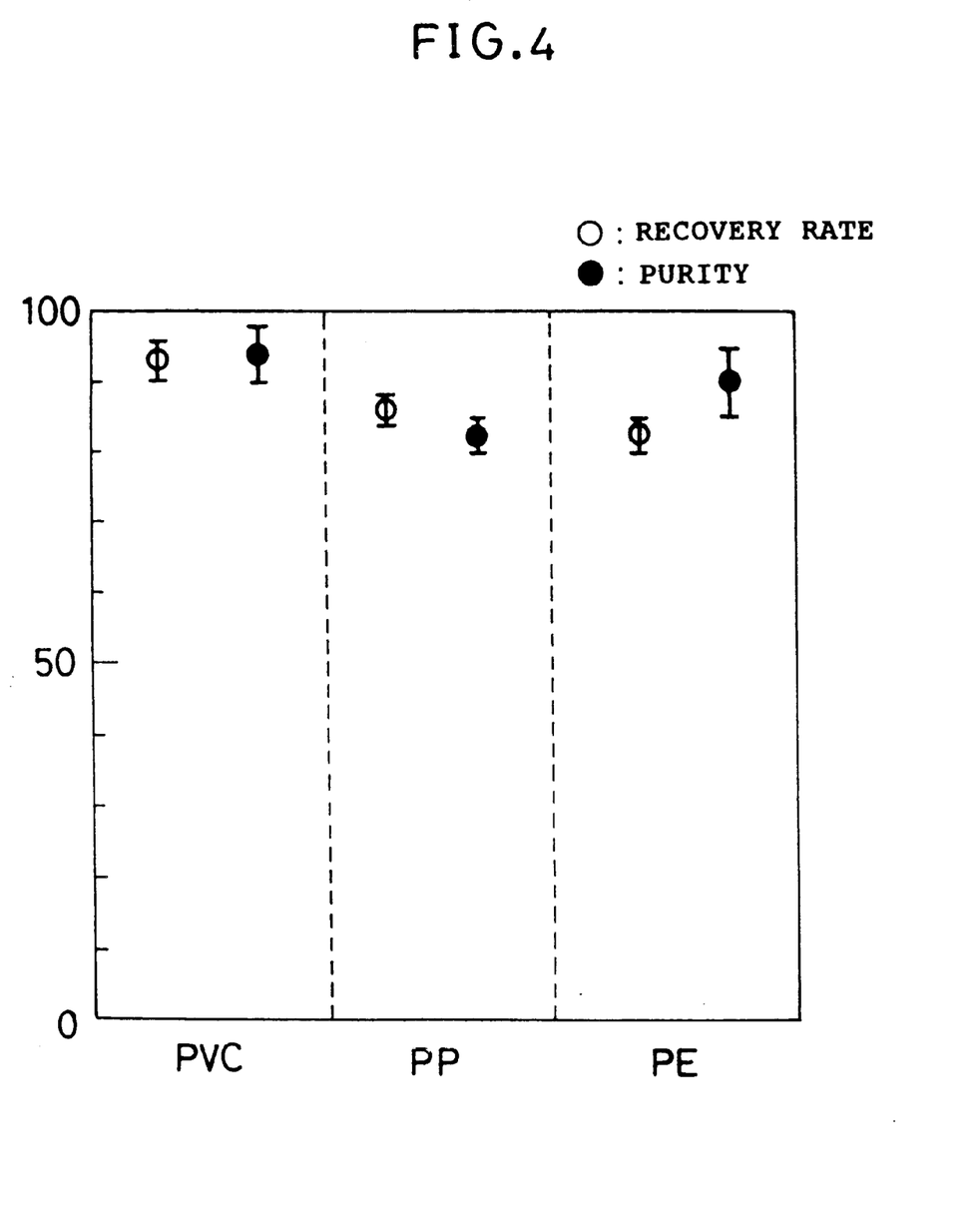
FIG. 4 is a graph showing the collection percentage and purity of plastic pieces according to kind.

FIG. 4 shows the results of electrostatic separation of the plastic pieces 16 with 30 kv imposed on the high voltage power source devices 24A and 24B, it being seen that the recovery rate and purity of PVC, PP, and PE were 80% or more. With the case of PE taken as an example, said, recovery rate and purity are defined as follow.

Recovery rate=collected PE weight in collecting chamber 49/total loaded PE weight Purity=collected PE weight in collecting chamber 49/collected plastic weight in collecting chamber 49

For reference, in the case of PP, "collecting chamber 49" in the above formula is replaced by "collecting chambers 48, 50," because what is intended is collection in the collecting chamber 48 and 50.

In addition, the PVC used as a friction material has its electric charge removed and,is cleaned by the reusing devices 39A and 39B and then fed back to the frictional charging devices 17A and 17B for reuse.

Thus, the first embodiment of the invention comprises a collecting section 26 disposed below separating spaces 22A and 22B, said collecting section having partition walls 52, 53, 54, and 55 adjustable for horizontal movement toward and away from metal drum electrodes 21A and 21B, a moving means 33 for horizontally moving said partition walls 52, 53, 54, and 55 according to the fall positions associated with the polarity and amount of electric charge of each plastic piece 16, said moving means 33 comprising a pair of guides 35 in which the partition walls 52, 53, 54, and 55 are horizontally disposed for movement toward and away from said metal drum electrodes 21A and 21B and which are individually attached to each partition wall 52, 53, 54, and 55 through a fitting member 34, a ball screw 37 threadedly fitted in a threaded member 36 attached to the fitting member 34 of the guide 35, and an unillustrated motor for rotating the ball screw 37. With this arrangement, if the separation of the plastic pieces 16 is found incorrect, the motor is driven to rotate the ball screw 37 to move the partition walls 52, 53, 54, and 55 according to the fall positions associated with the polarity and amount of electric charge of each plastic piece 16, the partition walls 52, 53, 54, and 55 being moved toward and away from the metal drum electrodes 21A and 21B.; thus accurate separation can be effected without changing the voltage from the high voltage power source devices 24A and 24B and even if the plastic pieces 16 differ in weight because the plastic pieces 16 are separated in advance according to weight in that they are separated according to diameter by the screen member 40 and hence even if the plastic pieces 16 differ in diameter.

A second embodiment of the invention will now be described with reference to FIG. 5. In addition, FIG. 5 shows one electrostatic separator 41B alone.

A plastic sorting device 15 according to the second embodiment of the invention is provided with a swing means 61 for swinging the partition walls 52, 53, 54, and 55 around said support shafts 60a–60d according to the fall positions associated with the polarity and amount of electric charge of each plastic pieces 16, so as to move the partition walls 52, 53, 54, and 55 according to the fall positions associated with the polarity and amount of electric charge of each plastic pieces 16.

Figure 5:
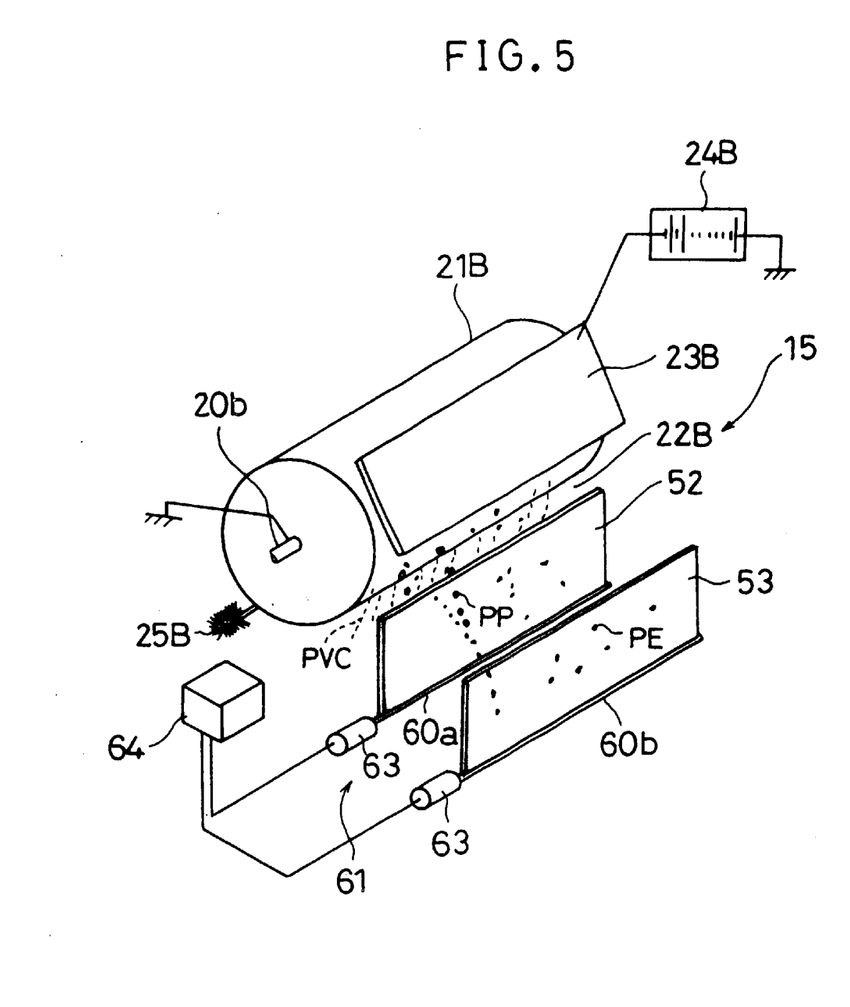
FIG. 5 is a principal perspective view of a plastic sorting device according to a second embodiment of the invention.

That is, the partition walls 5.2, 53, 54, and 55 are so constructed as to be swingable around the support shafts 60a–60d parallel to the horizontal shafts 20a and 20b of said drum electrodes 21A and 21B according to the fall positions associated with the polarity and amount of electric charge of each plastic pieces 16, and the swing means 61, as shown in FIG. 5, comprises swing motors 63 attached to the support shafts 60a–60d, and a controller 64 for driving these swing motors 63. The rest of the arrangement is the same as in the first embodiment described above and a description thereof is omitted.

In the above arrangement, if the separation of the plastic pieces 16 is found incorrect, the motors 63 are driven to swing the support shafts 60a–60d to move the partition walls 52, 53, 54, and 55 according to the fall positions associated with the polarity and amount of electric charge of each plastic pieces 16, moving the partition walls 52, 53, 54, and 55 toward and away from the metal drum electrodes 21A and 21B, whereby without changing the voltage from the high voltage power source devices 24A and 24B, the plastic pieces 16 can be correctly separated. The other operation/ working-effects are the same as in the first embodiment described above, and a description thereof is omitted.

In addition, in the above embodiments, PVC, which takes (−) in the electrification rank, is used as the friction material, but the invention is not limited to the use of PVC, and PS (polystyrene) and PMMA (polymethyl methacrylate), which are on the (+) side, may be used, in which case PP is attracted to the metal drum electrodes 21A and 21B and collected in the collecting chambers 48 and 50, PE is collected in the collecting chamber 49, and PS or PMMA is collected in the collecting chambers 47 and 51.

As is clear from the above description, the invention provides an arrangement wherein disposed below frictional charging devices for stirring different kinds of crushed plastic pieces for frictional charging, is a pair of electrostatic separating sections for electrostatic separation of each plastic pieces according to the polarity and amount of electric charge thereof, each electrostatic separating section comprising a drum electrode rotatable around. a predetermined horizontal shaft and an opposed electrode disposed adjacent the drum electrode through a separating space serving as a sorting electrostatic field, with a collecting section common to the electrostatic separating sections, disposed below the separating space between the drum electrodes for separately collecting the plastic pieces passing through said separating space and separated, said collecting section having a plurality of collecting chambers for collecting the plastic pieces according to kind, a classifying section being provided that, when plastic pieces are to be frictionally charged in the frictional charging devices, classifies the plastic pieces according to size and loading them into the frictional charging devices; thus accurate separation can be effected even if the plastic pieces differ in weight because the plastic pieces are separated in advance according to weight in that they are separated according to diameter by the classifying section and hence even if the plastic pieces differ in diameter.

Further, the collecting section comprises partition walls for partitioning a plurality of collecting chambers, said partition walls being constructed to be adjustable for horizontal movement toward and away from the drum electrodes, a moving means for horizontally moving the partition walls to the fall positions corresponding to the size of each plastic piece, or a swing means for swinging the partition walls around the support shafts to the fall positions corresponding to the size of each plastic pieces; therefore, plastic pieces can be correctly classified by moving or swinging the partition walls to the fall positions corresponding to the size of each plastic pieces by the moving means.

What is claimed is:

1. A plastic sorting device, comprising:

a pair of frictional charging devices (17) for stirring and frictionally charging different kinds of crushed plastic pieces (16);

a respective electrostatic separating section (41) disposed below each of said frictional charging devices for electrostatic separation of each plastic piece according to its polarity and amount of electric charge, said electrostatic separating sections (41) being disposed laterally in a substantially symmetrical relation, each of said electrostatic separating sections (41) having a drum electrode (21) rotatable around a predetermined horizontal shaft (20), said drum electrodes (21) rotating such that sides thereof facing each other turn downward; and an opposed electrode (23) disposed adjacent each said drum electrode (21) through a separating space (22) serving as a sorting electrostatic field, said sorting device being characterized by further comprising:

a collecting section (26) that is common to the electrostatic separating sections and that is disposed below the separating space (22) between said drum electrodes for separately collecting plastic pieces that have passed through said separating space and thereby separated, said collecting section (26) having a plurality of collecting chambers (47–51) for collecting plastic pieces according to kind; and a classifying section (40) that classifies said different kinds of crushed plastic pieces (16) into two groups according to size before they are frictionally charged, and thereafter loads the plastic pieces (16) into the respective frictional charging devices (17) according to group.

2. A plastic sorting device as set forth in claim 1, characterized in that the collecting section (26) has partition walls (52–55) for partitioning said plurality of collecting chambers (47–51), said partition walls being constructed to be adjustable for horizontal movement toward and away from the drum electrode (21), and a moving means (33) is provided for horizontally moving the partition walls to fall positions corresponding to the kind of each plastic piece.

3. A plastic sorting device as set forth in claim 1, characterized in that the collecting section (26) has partition walls (52–55) for partitioning said plurality of collecting chambers (47–51), said partition walls being constructed to be swingable around support shafts (60) parallel to the horizontal shaft of the drum electrode (21), and a swing means (61) is provided for swinging the partition walls around the support shafts to the fall positions corresponding to the kind of each plastic piece.

* * * * *